Dec. 26, 1944.    J. J. BLACK    2,365,934
TRAILER OR TRUCK ROOF STRUCTURE
Filed Aug. 12, 1941
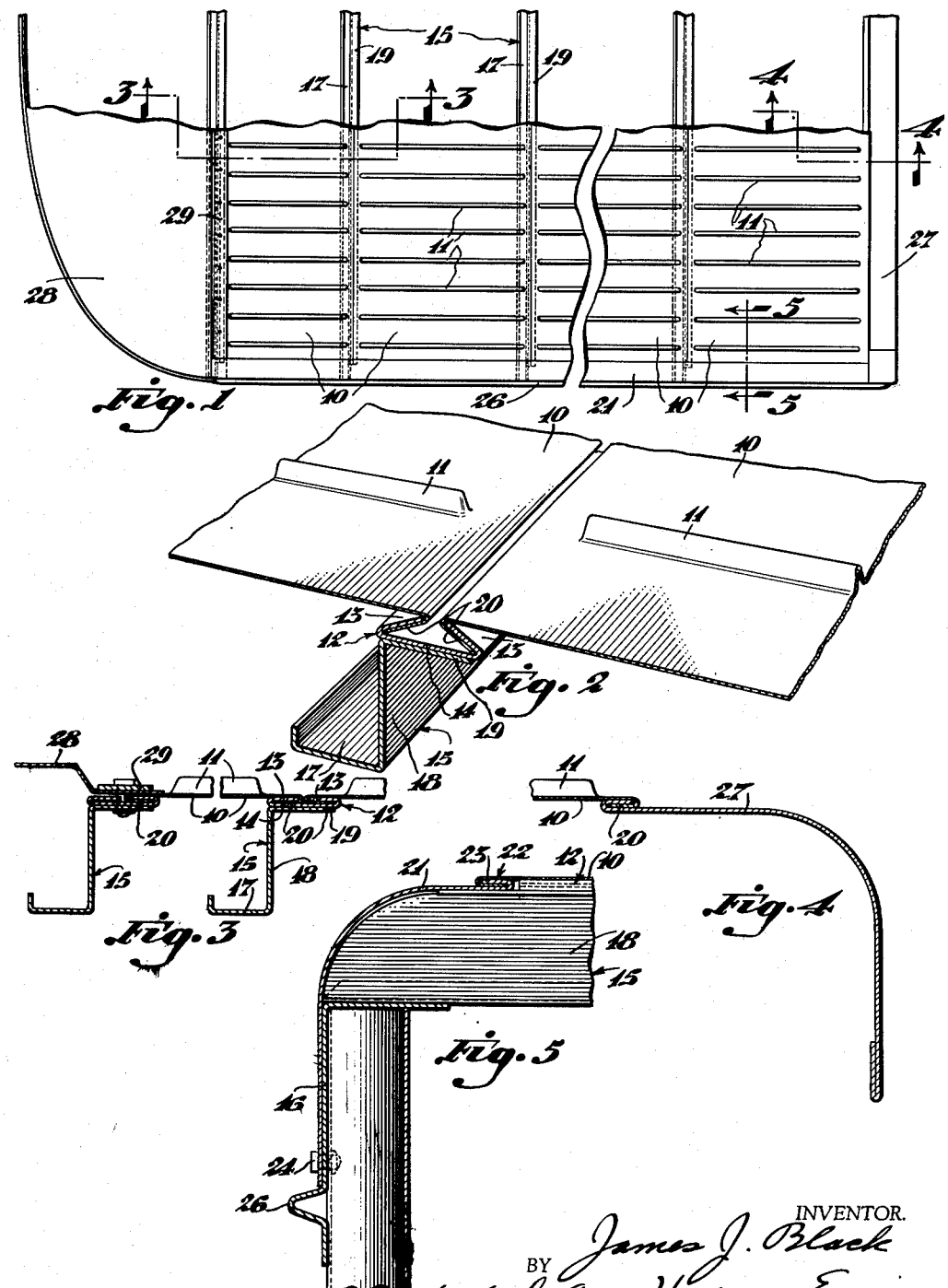
INVENTOR.
James J. Black
BY
Wood, Arey, Herron & Evans
ATTORNEYS Patented Dec. 26, 1944

2,365,934

UNITED STATES PATENT OFFICE 2,365,934

TRAILER OR TRUCK ROOF STRUCTURE

James J. Black, Cincinnati, Ohio, assignor, by mesne assignments, to The Trailer Company of America, Cincinnati, Ohio, a corporation of Delaware Application August 12, 1941, Serial No. 406,512

1 Claim. (Cl. 108—5.4)

This invention relates to trailer or truck bodies and is particularly directed to a new and improved roof construction for trucks and trailers.

It has been the broad object of the present inventor to provide a roof construction for trucks and trailers, which roof construction is light in weight, is strong, and is adapted to production methods of manufacture and assembly.

In a more detailed sense, it has been the further object of the present inventor to provide an improved fabrication of the roof whereby the roof, as made up of sheets of sheet metal, has been made leak-proof and more rigid and unitary by the use of a very simple and extremely efficient connection for the sheets, not only between the respective sheets, but between the sheets and the edge members of the roof as well.

It has been a still further object to construct this improved sheet connecting means so that the actual connection between the sheets is accomplished without the use of any attachment means other than flange members of the sheets cooperating with an attachment strip. The medium through which the sheets are connected together is combined with the normal cross members of the roof in a highly efficient manner, whereby the completed structure constitutes a tightly connected, substantially unitary roof with no opportunity for leakage at the joints between the sheets or along the joints between the sheets and the members connecting the roof to the wall.

Other objects and advantages of the present invention will be readily apparent from the following description of the drawing in which:

Figure 1 is a fragmentary top plan view of a trailer roof made in accordance with the invention with the roof panels or sheets broken away for better illustration.

Figure 2 is a fragmentary perspective view illustrating the manner in which the lock strip is fixed to a cross bow and how the roof panels are joined and interlocked with the strip.

Figure 3 is a fragmentary sectional view taken on line 3—3, Figure 1.

Figure 4 is a fragmentary sectional view taken on line 4—4, Figure 1.

Figure 5 is a sectional view taken on line 5—5, Figure 1.

The present roof construction is preferably all metal. In this structure, like metal roof structures provided in the past, the roof itself is constituted by a plurality of sections or panels. In the past, the sections were fastened to the ribs by rivets, or by bolts, or were welded together. All three of these methods were comparatively costly because of the time that they required. Also, without using some sort of sealing strip, the roof seams fastened by bolts or rivets were inclined to leak. This also held true for welding because of the particularly difficult job of making absolutely leak-proof continuous weld seams. The comparatively thin metal used for the sections made welding even more difficult. Welding had another disadvantage because in most instances it was necessary to grind off the weld seams for appearance's sake.

The present invention incorporates a new lock strip for fastening together the sections or panels comprising the roof. The inventor has discovered that the lock strip permits the use of even thinner metal panels than those used in the past. The thinner metal panels, since they weigh less, are easier to handle in assembly and provide finished bodies which are lighter in weight.

The lock strip has other important advantages. For one, the finished roof is absolutely leak-proof. Another advantage is that the lock strip permits rapid assembly, requiring only a fraction of the time used by the other methods mentioned above. Also, the lock strip is not affected by body vibrations of the type that tend to tear out bolt and rivet holes.

In the preferred embodiment, each lock strip is securely fastened to a cross beam or cross bow of the trailer or truck body. Bolts or rivets may be used for fastening the lock strip to the respective cross bows but their use is not recommended. The inventor has realized that welding has certain advantages over other methods of fastening metal to metal, and although its use in the roof itself is not good because of leaking, it is exceptionally strong and exceedingly rigid joints can be made. The inventor has realized these advantages and, accordingly, has designed new cross bows or cross beams which are adapted to support the lock strips and be spot welded to them. Spot welding, unlike continuous seam welding, can be accomplished by production methods, and therefore, speeds up assembly rather than slowing it down.

The present structure is exceptionally strong. The lock strips, when fixed to the cross bows, become an integral part of them. And the panel sections, when joined together by the lock strip, become a unitary structure. The whole roof, therefore, is made into a rigid unit.

The metal used for the roof sheets is preferably 24 gauge, high tensile strength sheet steel. The inventor has found that this particular gauge steel is strong enough in relation to its weight to be well suited to most roof structures. Thicker or thinner metal may be used when necessary.

The roof is made up of a number of panel sections 10. The sections extend substantially the full width of the trailer and are joined marginally, section to section, on lines running laterally of the truck or trailer. Each section may be strengthened by a plurality of ribs 11 formed by stamping. These ribs extend cross-wise of the sections and therefore lengthwise of the roof when installed.

These ribs prevent buckling of the sheets making up the roof, when there is a distorting force on the roof. The flat areas being small, there is little or no opportunity for ridges and low spots to form in these areas. Obviously, prevention of this is desirable to preclude the presence of pools of water in the roof.

The panel sections are fastened together by a channel-like interlock strip 12 which has a pair of flanges 13—13 extending from a base 14. The flanges are bent in toward each other at an angle of approximately 45° to the base, leaving an opening into the channel between the adjacent edges thereof. Each lock strip 12 is supported by and fixed to a cross bow 15. The cross bows are fixed to the side walls 16 of the trailer or to uprights (not shown) by welding or other means.

Each cross bow includes a channel portion 17 which has one wall 18 extended upwardly and turned over away from the channel portion 17 to constitute a horizontal flange 19. The base 14 of the interlock strip 12 is fixed to the flange 19. In the preferred embodiment the two are spot welded together. The opening between the adjacent edges of the flanges of the strip 12 and the clearance below the flange 19 affords ready access for the electrodes of a spot welder (Figure 2).

At the forward and rear edges of each panel 10, a lip 20 is turned downward back under the panel at an angle of approximately 45°. Figure 2 illustrates the manner in which two panels are joined by the lock strip. The respective lips 20 of the two panels are inserted in the channel defined by the two angular flanges 13—13 of the lock strip. The lips and flanges are preferably set on the same angle and are equally wide. The strip is locked, for fastening the panels together, by pressing and flattening the joint. The joint then appears as shown in Figure 3 with the respective lips of the panels interlocked between the respective flanges 13—13 and the base 14 of the strip. It will be noted that the two panels meet when the strip is flattened. The joint thus made is rigid, of neat appearance and absolutely leak-proof.

At the sides of the roof the panels are engaged by an edge strip 21 that is joined to the panels by a similar lock joint 22 (Figure 5). These strips or panels 21 are curved from the plane of the trailer side to the plane of the roof and thus embellish the structure. In this instance, the lips turned under from the panels are interlocked with a lip 23 turned back over the top of the edge strip 21. It will be noted that the edge strip 21 extends the full length of the side of the roof and is interlocked with every one of the panels, thus further strengthening the roof and making it into an even more unitary structure. The strip 21 extends down over the edge of the roof and is bolted or riveted to the side wall of the trailer as at 24. The edge of the roof may be rounded as shown and a rub rail provided as at 26.

At the rear edge of the roof (Figure 4) a joint similar to the joint 22 is provided between the rearmost panel and a strip 27 extending across the top at the back of the truck or trailer.

At the front, the roof is fastened to the cap, indicated at 28, by means of rivets or bolts. In this instance, the forward section is engaged in the lock strip 12 and the back edge of the cap 28 then overlapped on the joint. The cap, lock strip, and cross bow are then bolted or riveted together. At this point a reinforcing strip 29 may be used to protect the rivet or bolt holes from becoming enlarged due to body vibrations.

Having described my invention, I claim:

In a roof construction for vehicles, a plurality of metal sheets disposed transversely of the vehicle, said sheets having downwardly extending flanges formed along the end edges thereof, a series of cross rail members disposed beneath said metal sheets, said cross rail members being of general Z configuration and including flanges extending laterally in opposite directions, a connecting strip disposed on the upper surface of each of the upper flanges and welded thereto, said connecting strips including flanges along the side edges thereof for interlocking with the flanges on the edges of the metal sheets, said interlocked flanges when disposed substantially flush with the upper surfaces of the connecting strips forming a substantially continuous upper surface with the edges of adjoining sheets in close proximity one to the other.

JAMES J. BLACK.